(12) United States Patent
Okamoto et al.

(10) Patent No.: US 8,138,458 B2
(45) Date of Patent: Mar. 20, 2012

(54) MICROWAVE CHEMICAL REACTION DEVICE

(75) Inventors: Tadashi Okamoto, Sano (JP); Eiji Matsuo, Sano (JP); Masahiro Yasuda, Sano (JP)

(73) Assignee: Kabushiki Kaisha IDX, Sano-shi Tochigi (JP)

( * ) Notice: Subject to any disclaimer, the term of this patent is extended or adjusted under 35 U.S.C. 154(b) by 1023 days.

(21) Appl. No.: 11/794,233

(22) PCT Filed: Dec. 28, 2005

(86) PCT No.: PCT/JP2005/024111
§ 371 (c)(1),
(2), (4) Date: Apr. 1, 2008

(87) PCT Pub. No.: WO2006/070881
PCT Pub. Date: Jul. 6, 2006

(65) Prior Publication Data
US 2009/0045891 A1 Feb. 19, 2009

(30) Foreign Application Priority Data

Dec. 28, 2004 (JP) .................... 2004-380132
Dec. 28, 2004 (JP) .................... 2004-380133
Mar. 28, 2005 (JP) .................... 2005-091313

(51) Int. Cl.
*H05B 6/64* (2006.01)
(52) U.S. Cl. .................... 219/678; 427/575; 332/129
(58) Field of Classification Search .............. 219/678, 219/121.43; 332/129, 163; 333/329; 118/723 MW, 118/723 MA, 723 MP, 723 AN, 718, 719; 427/575, 569; 438/728, 712, 714, 732; 156/345.42, 156/345.46
See application file for complete search history.

(56) References Cited

U.S. PATENT DOCUMENTS

| 2,975,379 | A | * | 3/1961 | McLeod, Jr. ............. 332/129 |
| 4,673,560 | A | | 6/1987 | Masse et al. ............. 423/532 |
| 5,629,054 | A | * | 5/1997 | Kanai ..................... 427/575 |
| 2004/0026039 | A1 | | 2/2004 | Goto et al. ............. 156/345.41 |

FOREIGN PATENT DOCUMENTS

| JP | 59-45929 | 3/1984 |
| JP | 61-225580 | 10/1986 |
| JP | 62-44038 | 3/1987 |
| JP | 1-133910 | 5/1989 |
| JP | 11-111446 | 4/1999 |
| JP | 2002-79078 | 3/2002 |
| JP | 2002-210359 | 7/2002 |
| JP | 2003-133232 | 5/2003 |

* cited by examiner

Primary Examiner — Quang Van
(74) Attorney, Agent, or Firm — Jacobson Holman PLLC

(57) ABSTRACT

The invention performs uniform chemical reactions with high efficiency by action of microwave onto reaction targets placed within a flow path along a center axis of a waveguide for transmission of microwave. The microwave chemical reaction device includes a circular waveguide for transmission of TM or TE mode microwave or a square waveguide for transmission of TE mode microwave and a flow path shielded from a space within the waveguide by a bulkhead of low microwave loss and coaxially extending along the center axis of the waveguide. Reaction targets to be subjected to chemical reactions are accommodated in the flow path and the microwave acts on the reaction targets within the flow path.

3 Claims, 8 Drawing Sheets

MICROWAVE CHEMICAL REACTION DEVICE

This is a national stage of PCT/JP05/024111 filed Dec. 28, 2005 and published in Japanese.

FIELD OF THE INVENTION

The present invention relates to a chemical reaction device for promotion of chemical reactions via irradiation of microwave onto reaction targets, and more particularly relates to a microwave chemical reaction device for uniform and high efficiency heating of reaction targets such as liquids, gases and powders to be subjected to chemical reactions without use of cavity resonators.

BACKGROUND ARTS

Microwave is broadly used as a heat source for electronic ranges and industrial heating furnaces. When compared with conventional devices for external heating of reaction targets, microwave is characterized by high efficiency and rapid heating of reaction targets since microwave is able to directly or indirectly heat polar dielectric substances not only heating water contained in substances.

It was recently found that microwave irradiation can promote chemical reactions of reaction targets and, as a consequence, use of microwave not only for heating devices but also for chemical reaction devices for rapid chemical reaction attracts attention of ones skilled in the art. For this reason, various experimental devices for use of microwave have been developed.

Microwave heating experimental devices are classified into three major groups, i.e. matching type waveguides connected at one end to matched loads, short circuit type waveguides with short circuit ends and cavity resonation type waveguides with cavity resonators. In general, chemical reactions are carried out with reaction targets being placed within these heating devices.

The matching type waveguide can be usually used without any adjustment. But the waveguide of this type has a disadvantage that only a part of the power generated by transmitted microwave can be utilized since action is performed only at the moment of passage of microwave through reaction targets due to their structural characteristics. Despite such disadvantage, the waveguide of this type now enjoys increasing use in the art because of its high ability for promotion of chemical reactions.

The short circuit type waveguides are able to utilize reflected microwave. The waveguide of this type has an advantage of improvement in operating efficiency through phase adjustment in which phases of advancing and reflected microwave are matched at the position of reaction targets. Nevertheless, it has a disadvantage that the short circuit position needs to be adjusted in accordance with difference and variation in dielectric characteristics of the reaction targets.

Square waveguides are generally used for the above-described both types of waveguides as disclosed in Japanese Patent Opening 2002-079078. The major disadvantage of these types of waveguides is insufficient operating efficiency caused by partial utilization of the power generated by microwave. As known, high operating efficiency is a very important requirement for reaction devices used in chemical plants.

The cavity resonation type waveguide has an advantage of extremely high operating efficiency thanks to repeated irradiation of microwave onto reaction targets via multiple reflections by the wall defining the cavity. Despite such advantage, the waveguide of this type has a disadvantage that tuning by adjustment of resonant frequencies is inevitable in accordance with difference and variation in characteristics of the reaction target.

One more important requirement for chemical reaction devices is uniformity in reaction. In order to suffice this requirement, it is necessary to irradiate microwave of at least in average and cumulatively uniform intensity on reaction targets. Presently, devices unsuited for uniform heating are used experimentally.

It is therefore highly required presently to develop microwave chemical reaction devices which can afford high efficiency characteristics of the cavity resonation type waveguides with easy adjustment of the matching type waveguides.

DISCLOSURE OF THE INVENTION

The present invention is proposed to suffice the above-described requirement and intends to provide novel means for promoting chemical reactions through irradiation of microwave.

The solution is given by provision of a microwave chemical reaction device which is provided with a square or circular waveguide for transmission of microwave of a specified mode and a flow path arranged coaxially within the waveguide and isolated from the interior space in the waveguide by a microwave low loss wall.

The flow path accommodates reaction targets to be subjected to chemical reaction and irradiated microwave acts on the reaction target in the flow path. The square waveguide is suited for transmission of TE10 mode microwave whereas the circular waveguide is suited for transmission of TM01 mode microwave. Since action by the microwave is continuous over a long distance along the direction of transmission in the waveguide, thereby enabling effective utilization of microwave.

A circular tube is arranged within the circular waveguide for transmission of TM01 mode microwave along the central axis of the waveguide and a flow path of a circular cross section is formed within the circular tube. This flow path may also be formed by an inner flow space and an annular outer flow space embracing the inner flow space and these spaces are in communication with each other at one end of the circular tube of a double cylindrical construction.

A square tube is arranged coaxially within the square waveguide for transmission of TE10 mode microwave to form a flow path of a square cross section. The cross section of the square tube is defined by two short sides parallel to the long sides of the cross section of the square waveguide and two long sides parallel to the short sides of the waveguides.

One end of the circular waveguide is connected via a mode transducer to one end of the square waveguide for transmission of the TE10 mode microwave and the TE mode microwave within the square waveguide is transduced into a TM01 mode microwave by the mode transducer for transmission to the circular waveguide. The flow path for accommodating the reaction target is arranged within the circular waveguide. The downstream end of the square waveguide is shorted out by the short-circuit piece. The mode transducer is formed by perpendicular connection of one end of the circular waveguide to the square waveguide on the upstream side of the short-circuit piece associated with the square waveguide.

TM01 mode microwave mode transduced from the TE mode microwave is transmitted to the circular waveguide. The downstream section of the circular tube defining the flow path extends axially though the square waveguide along the axis of the circular waveguide for exposure to the outside. Alternatively, the downstream section of the circular tube may be curved substantially at right angle in parallel to the axis of the circular waveguide near junction of the circular and square waveguides for exposure to the outside. The other end of the circular waveguide may be shorted so as to reflect most of electro magnetic wave so that the TM01 mode microwave should be absorbed by the reaction target during its circulation in the circular waveguide.

The downstream end of the first square waveguide for transmission of the TE10 mode microwave is shorted by the first short circuit piece and one end of the circular waveguide is substantially at right angle connected to the first square waveguide on the upstream side of the short circuit piece to form the first mode transducer.

The second square waveguide is substantially at right angle connected to the other end of the circular waveguide and the end of the second square waveguide near the junction to the circular waveguide is shorted by the second short circuit piece associated with the second square waveguide to form the second mode transducer. The other end of the second square waveguide is closed by a non-reflective end piece. The TM01 mode microwave transduced from the TE10 mode microwave in the square waveguide is transmitted to the circular waveguide and the flow path for the reaction target is arranged within the circular waveguide. The TE10 mode microwave re-transduced from the TM01 mode microwave in the circular waveguide is transmitted into the second square waveguide for consumption at the non-reflective end piece.

The square flow path forming a flow path in the square waveguide may be open at the top end. A ventilation unit is affixed to the waveguide for exhaust of gas vaporized via chemical reaction from the reaction target within the flow path.

In accordance with the present invention, the action of the microwave onto the reaction target is continued over a long distance in the direction of transmission of microwave and, as a consequence, the electric field generated within the waveguide can be utilized at high operation efficiency. Since microwave is uniformly irradiated onto the reaction target placed within the flow path so that chemical reactions can be uniformly promoted.

PREFERRED EMBODIMENTS

The preferred embodiments of the microwave chemical reaction device in accordance with the present invention will now be explained in reference the accompanying drawings.

Figure 1:
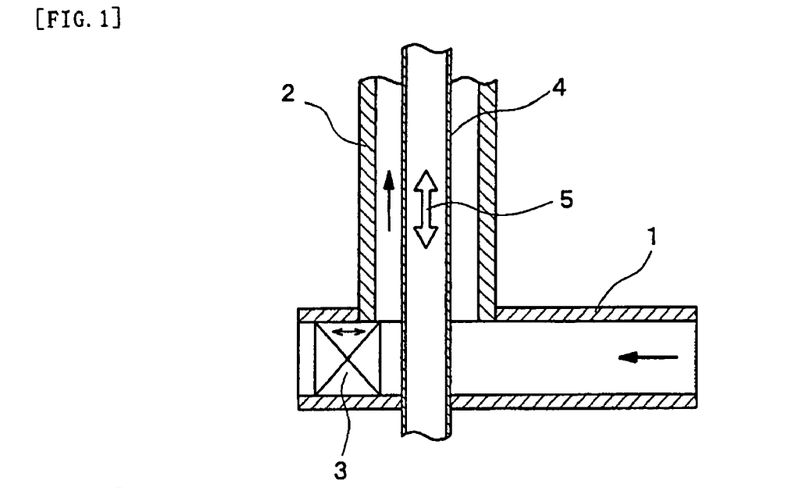
FIG. 1 is a sectional side view of one embodiment of the microwave chemical reaction device in accordance with the present invention.

FIG. 1 shows one embodiment of the reaction device in accordance with the present invention, in which a circular waveguide 2 having a circular transverse cross section is connected substantially at right angle to a square waveguide 1 having a square transverse cross section. The downstream end of the square waveguide 1 is closed by a short-circuit piece 3. The short-circuit piece 3 is given in the form of a rectangular solid of a proper thickness suited for shorting the waveguide for electric shorting of the square waveguide 1.

Figure 2:
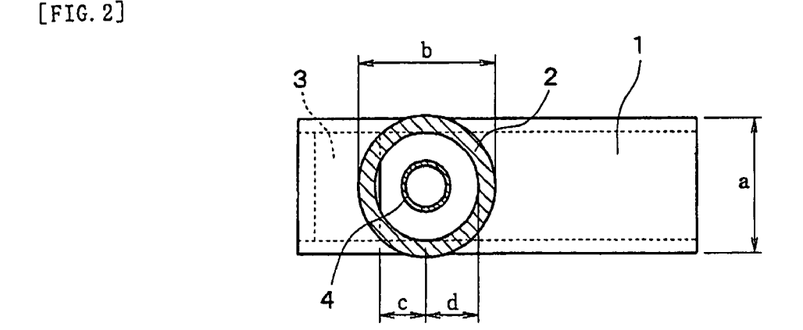
FIG. 2 is a partly sectional plan view of the microwave chemical reaction device in accordance with the present invention.

As shown in FIG. 2, the distance of the long side of the square waveguide 1 in a plane at right angle to the waveguide axis id "a". The circular waveguide 2 has a diameter "b" substantially equal to the long side distance "a" of the square waveguide 1 and its waveguide axis is substantially at right angle to the waveguide axis of the square waveguide.

A circular tube 4 is coaxially arranged within the circular waveguide 2 and accommodates a reaction target. The circular tube 4 is made of a dielectric material of low microwave loss. In the case of the illustrated embodiment, the reaction target flows upwards from the bottom or downwards to the bottom.

In the illustrated arrangement, TE10 mode microwave transmitted leftward in the square waveguide 1 is transduced to TM01 mode microwave at the junction of the waveguide 1 and 2 and further transmitted upwards in the circular waveguide 2. The short-circuit piece 3 determines adjustment of microwave and percent transduction of mode. When the positions of shorting and the circular waveguide 2 and the circular tube 4 are designed properly, almost 100% of TE10 mode microwave is transduced to TM01 mode microwave. The position of the short-circuit piece 3 may be adjusted in the axial direction within the square waveguide 1.

Although TE 11 mode microwave is unnecessary for the present invention, its generation is almost negligible. The circular waveguide 2 is designed so that higher mode microwaves beyond TE21 mode should enter into the cutoff region of the circular waveguide 2. The distance "c" between the axis of the circular waveguide 2 and the shorting plane of the short-circuit piece 3 is set smaller than the inner radius "d" of the circular waveguide 2. This design assures the optimum adjustment of mode transduction.

The TM01 mode microwave acts on the reaction target 5 to promote its chemical reaction. That is, the energy carried by the TM01 mode microwave is absorbed by the reaction target 5 during its transmission through the circular waveguide 2 for attenuation. The degree of this absorption is proportional to the square of the intensity of the electric field within the reaction target 5, The relative dielectric constant of the reaction target 5 is 1 or larger. When the electric field outside the reaction target 5 and the interface of the reaction target 5 cross each other at right angle, the electric field is attenuated to (1/relative dielectric constant) within the reaction target 5 to reduce the action by the microwave on the reaction target 5.

The reaction device of the present invention, however, suffices the interface condition that the electric field outside the reaction target and the interface of the reaction target are parallel to each other over almost the entire axial distance of the waveguide and, as a consequence, the electric fields inside and outside the reaction targets are same in intensity and continuous for efficient absorption of the microwave by the reaction target 5. When the length of the circular waveguide 2 is selected properly, the energy carried by the TM01 mode microwave is almost all absorbed by the reaction targets 5. As a result, extremely efficient heating and chemical reaction can be conducted. Since the reaction device in accordance with the present invention is not the resonator type, no tuning is necessary whilst assuring efficiency almost same as that by a reaction device of the resonator type.

The intensity of the electric field for TM01 mode microwave within the circular waveguide 2 remains constant along the peripheral direction of the waveguide 2 and relatively small in variation in the diametral direction. As a consequence, the reaction target 5 within the circular tube 4 can be heated uniformly in the peripheral direction. Diametral heating is also appreciably uniform. As the reaction targets 5 flows in the axial direction of the circular tube 4, all components of the reaction target absorb the microwave energy carried by the microwave almost uniformly. As a result, reactions of the components of the reaction target 5 acted on by the microwave can be expected almost uniform.

Figure 3:
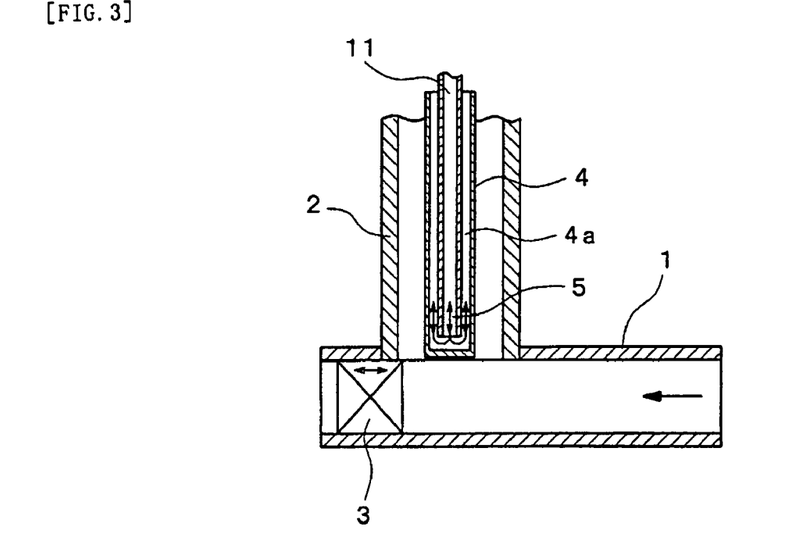
FIG. 3 is a sectional side view of another embodiment of the flow path for the reaction target or the reaction device in accordance with the present invention.

In the case of the embodiment shown in FIG. 3, a circular tube 4 of a double construction including an inner tube 11 is coaxially arranged within the circular waveguide 2. An annular flow path 4a is formed surrounding the inner tube 11. The reaction targets 5 flowing in the circular tube 4 change their direction near the junction between the waveguide 1 and 2 and continues to flow in the reverse direction.

The reaction targets 5 transmitted downwards in the inner tube 11 are transmitted upwards in the annular flow path 4a after arrival at the closed end of the circular tube 4. Conversely, the reaction targets 5 transmitted upwards in the inner tube 11 may be transmitted downwards in the annular flow path 4a after arrival at the closed end of the circular tube 4. The reaction device in accordance with the present invention suffices the interface condition that the electric field of the microwave transmitted through the circular waveguide 2 is parallel to the most region of the interface and, as a consequence, the electric field is continuous outside and inside the reaction targets 5 for efficient heating of the reaction targets.

The intensity of the electric field follows the TM01 mode microwave distribution. That is, the intensity of the electric field is a little larger inside the inner tube 11 than inside of the circular tube 4 and, as a consequence, the direction of flow of the reaction targets can be properly selected in accordance with the desired heating schedule.

In the case of the embodiment shown in FIG. 1, the circular tube 4 extends vertically through the square waveguide 1. In the case of the embodiment shown in FIG. 3, the circular tube 4 terminates at the junction of the waveguide 1 and 2 for formation of a reversed flow path for the reaction targets 5.

Figure 6:
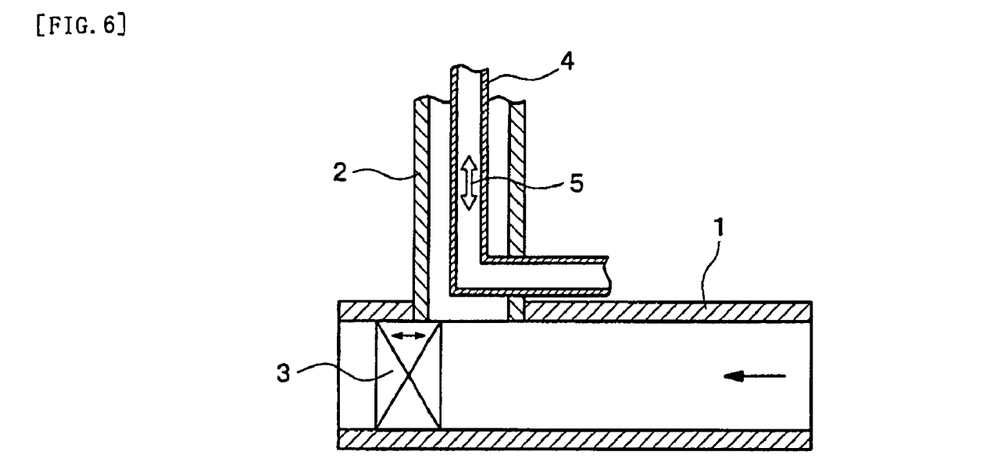
FIG. 6 is a sectional side view of the other embodiment of the flow path for the reaction target or the reaction device in accordance with the present invention.

The construction of the circular tube 4 is not limited to above-described embodiment. For, example, the lower end of the circular tube 4 may be bent at a proper angle near the junction of the waveguides 1 and 2 for exposure outside the circular waveguide 2 as shown in FIG. 6. It is only required that the circular tube 4 should be a circular cylinder able to internally accommodate the reaction targets 5.

Figure 4:
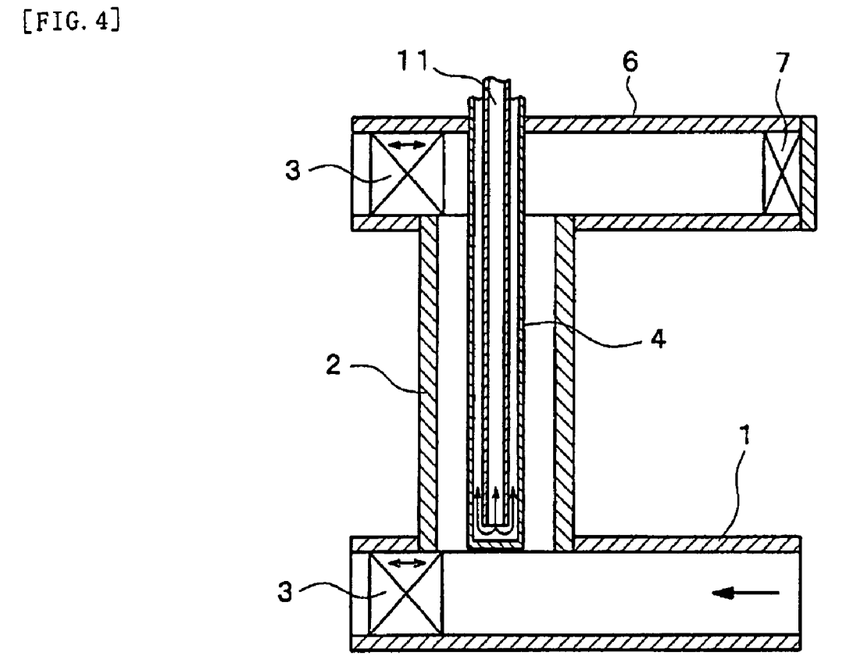
FIG. 4 is a sectional side view of another embodiment of the microwave chemical reaction device in accordance with the present invention.

The other embodiment of the reaction device in accordance with the present invention is shown in FIG. 4 in which another square waveguide 6 is connected to the upper end of the circular waveguide 2. Although the upper and lower square waveguide 1 and 6 are parallel to each other in the illustrated arrangement, the parallel arrangement is not indispensable as long as the axes of the square waveguides 1 and 6 are substantially at right angle to the axis of the circular waveguide 2. The mode of junction of the upper square waveguide 6 to the circular waveguide 2 is same as that of the lower square waveguide 1.

The microwave arrives at the top of the circular waveguide 2 from the lower square waveguide 1 and is transmitted to the upper square waveguide 6. A non-reflective end piece 7 is arranged in the end of the upper square waveguide 6 opposite to the short-circuit piece 3. During travel through the entire reaction device of this embodiment, the TE10 microwave is transduced to the TM01 microwave and re-tranceduced back to the TE10 microwave. The reminder of the microwave not used for heating is consumed at the non-reflective end piece 7. By proper choice of the length of the circular waveguide 2, almost all of the energy carried by the microwave can be absorbed by the reaction target 5. The length of the circular waveguide 2 is determined in consideration of the space capacity of the reaction device and the degree of acceptable efficiency.

Figure 5:
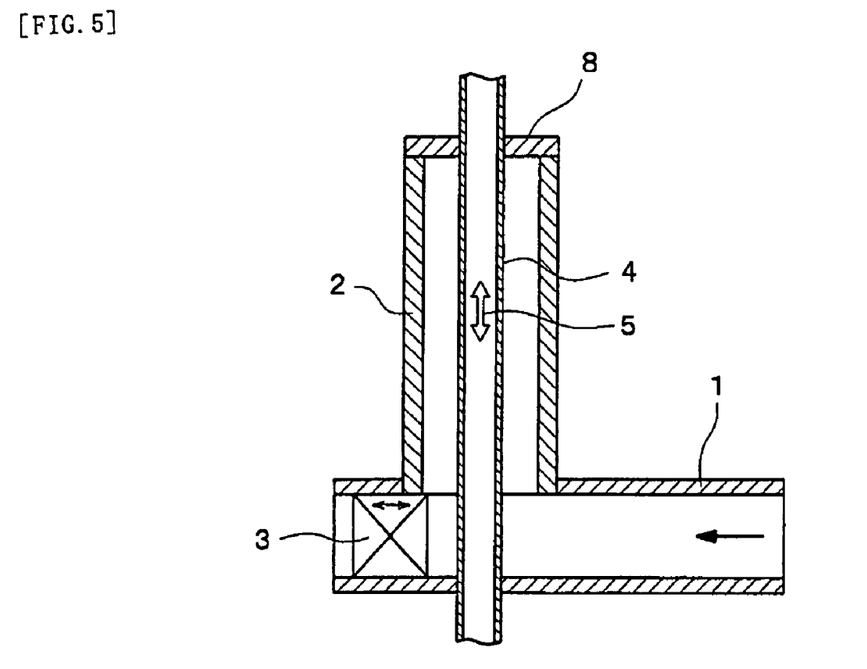
FIG. 5 is a sectional side view of the other embodiment of the microwave chemical reaction device in accordance with the present invention.

Further embodiment of the reaction device in accordance with the present invention is shown in FIG. 5 in which the upper end of the circular waveguide 2 is electrically shorted out by a short-circuit board 8. The microwave transmitted upwards in the circular waveguide 2 is reflected by the short-circuit board 8 and travels downwards. The energy carried by the microwave is absorbed by the reaction target 5 flowing into or stagnating in the circular tube 4. When the reaction device in accordance with the present invention is designed so that the microwave returning to the square waveguide 1 should become sufficiently small, high degree of operation efficiency can be achieved.

In the case of the embodiment shown in FIG. 4, the non-reflective end piece 7 is arranged in on end of the upper square waveguide 6. As an alternative, a short-circuit piece may be arranged at the same position in order to obtain same effect as the embodiment shown in FIG. 5.

Figure 7:
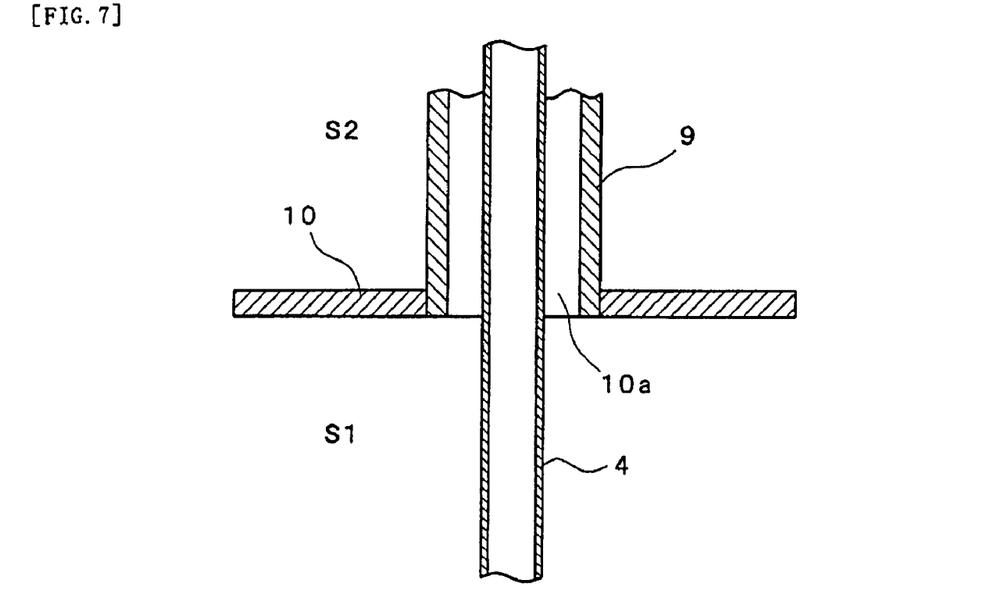
FIG. 7 is a side sectional view of the construction for preventing leakage of electro-magnetic wave used for the reaction device in accordance with the present invention.

In the arrangement shown in FIG. 7, a microwave shielding tube 9 is arranged surrounding the circular tube 4. A bulkhead 10 is attached to the microwave shielding tube 9 in order to separate a region S1 wherein microwave is present and a region S2 wherein no microwave is present. The microwave is weak in the region S2 above the bulkhead 10. The inner diameter of the microwave shielding tube 9 is determined so as to contain the microwave within the shielding region. The length of the microwave shielding tube 9 is determined so as to sufficiently attenuate the microwave leaking out from the space 10a accepting the circular tube 4 for accommodating the reaction targets 5.

Figure 8:
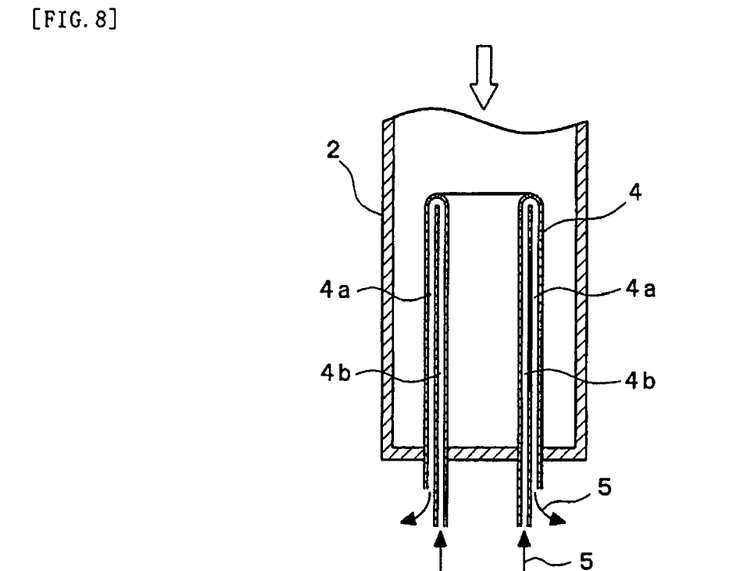
FIG. 8 is a sectional side view of the basic construction of the other embodiment of the microwave chemical reaction device in accordance with the present invention.

A further embodiment of the reaction device in accordance with the present invention is shown in FIG. 8 in which TE01 mode microwave is transmitted downwards in the circular waveguide 2. A cylindrical circular tube 4 is coaxially arranged within the circular waveguide 2. The cylindrical circular tube 4 has a coaxial double construction with outer and inner flow paths 4a and 4b communicating to each other at the top ends. The cylindrical circular tube 4 is made of a dielectric material for low loss transmission of microwave.

The two flow paths 4a and 4b of the circular tube 4 is located near a position whereat the electric field of TE01 mode microwave is maximum, i.e. near a position properly spaced from the axis of the circular waveguide 2 and its side wall. Irradiation of the microwave onto the reaction targets 5 is carried out during its travel through the two flow paths 4a and 4b. In the case of the illustrated arrangement, the reaction target 5 arrives at the top end through one of the flow paths 4a and 4b and changes its direction so as to flows downwards through the other of the two flow paths 4a and 4b. The arrows in the illustration indicate the directions of flow when the reaction target 5 flows from the inner flow path 4a to the outer flow path 4b. Chemical reaction of the reaction targets 5 is promoted under action by the TE mode microwave.

Proper adjustment of the length of the circular tube 4 coaxial with the circular waveguide 2 allows almost perfect absorption by reaction targets 5 of the energy carried by the microwave. The electric field generated by the microwave extends along the periphery of the circular waveguide 2 and its intensity is constant in the peripheral direction. In the diametral direction, the intensity of the electric field assumes zero level on the center axis and increases higher as the diameter increases. After assuming the maximum level, it becomes zero level on the wall surface of the waveguide. So, the flow of the reaction target 5 is adjusted to be located near the region of this maximum level.

In this case, since the electric field of the circular waveguide extends along the interface of the reaction targets, the intensity of the electric field assumes a same level on the inner and outer sides of the reaction targets and, as a consequence, the chemical reaction is carried out efficiently thank to the action by the electric field of high intensity.

The TE01 mode electric field transmitted in the axial direction within the waveguide is gradually attenuated whilst performing sine curve periodical change in accordance with the wavelength within the waveguide. Since the reaction targets flow in the axial direction, the reaction targets experience microwave energy of almost same accumulated level.

In accordance with the present invention, the intensity of the microwave is near zero level at the end (the lower end in the illustration) of the circular waveguide 2 and, as a consequence, it is not required to design in detail the construction of the waveguide end and the piping of the reaction targets 5. Even when the electric field arrives at the waveguide end without sufficient attenuation, it is acceptable that the electric field is attenuated to a negligibly small level when the microwave arrives at the top end of the circular tube 4.

Figure 11:
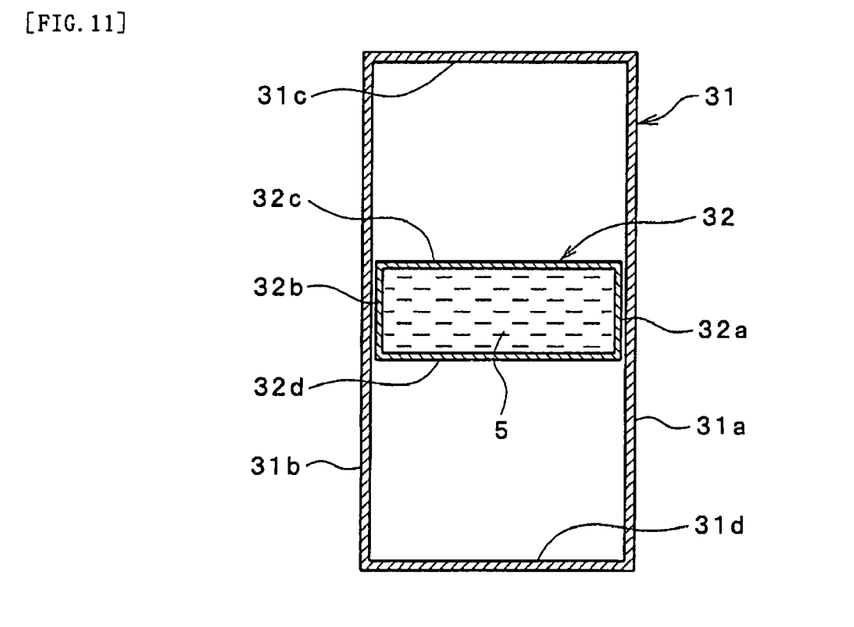
FIG. 11 is a section taken along the line XI-XI in FIG. 9.
Figure 12:
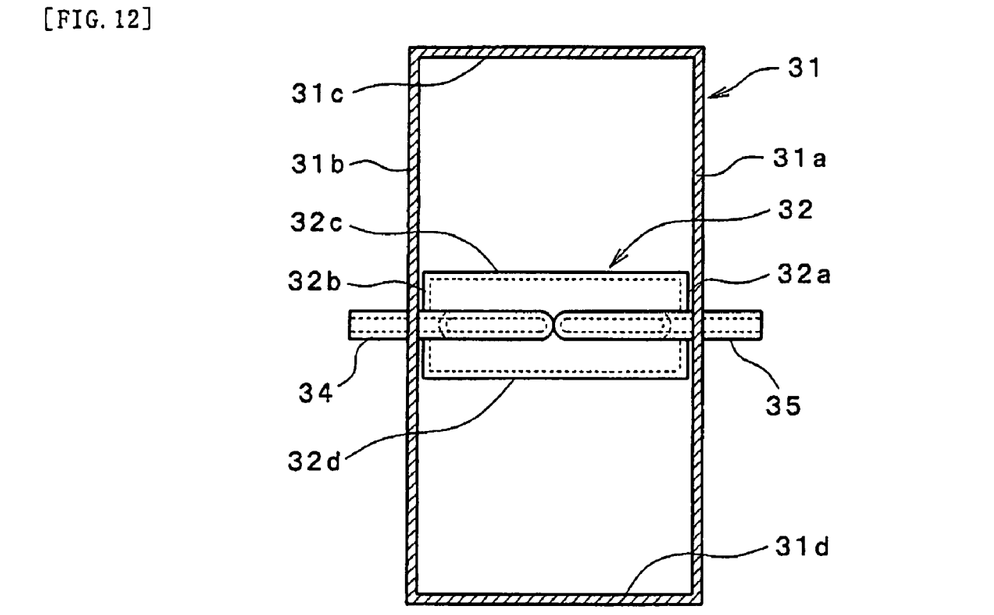
FIG. 12 is a section taken along the line XII-XII in FIG. 9.

A further embodiment of the reaction device in accordance with the present invention is shown in FIG. 11 in which a flow path 32 of a square transverse cross section is arranged substantially at the center of a square waveguide 31 for flow of the reaction targets 5. The flow path 32 is made of a dielectric material of small microwave absorption and provided with a rectangle which has a long sides in the direction of the short sides of the square waveguide 31 (in the horizontal direction in the illustration) and a short sides in the direction of the long sides of the square waveguide 31 (in the vertical direction in the illustration).

When nothing is placed within the square waveguide 31, the microwave to be transmitted in the waveguide is in TE10 mode and electric field of this mode travels in the short sides direction of the square waveguide 31, its intensity changes in a sine curve fashion with respect to the long side direction, assumes the maximum level a the center and presents no change in the short side direction.

When dielectric material is placed within the square waveguide 31, the distribution of the electric field usually presents slight changes. In the case of the arrangement shown in FIG. 11, however, the interfaces of the microwaves 5 i.e. the upper and lower surfaces of the flow path 32 are parallel to the electric field and, as a consequence, the intensity of the electric field remains unchanged outside and inside the dielectric material. Since the distribution of the electric field within the reaction targets 5 is almost uniform, uniform chemical reaction can be expected. When the interface conditions are improperly designed, the distribution of the electric field outside and inside the dielectric material is much disturbed and the intensity of the electric field within the dielectric material assumes a low level.

Figure 9:
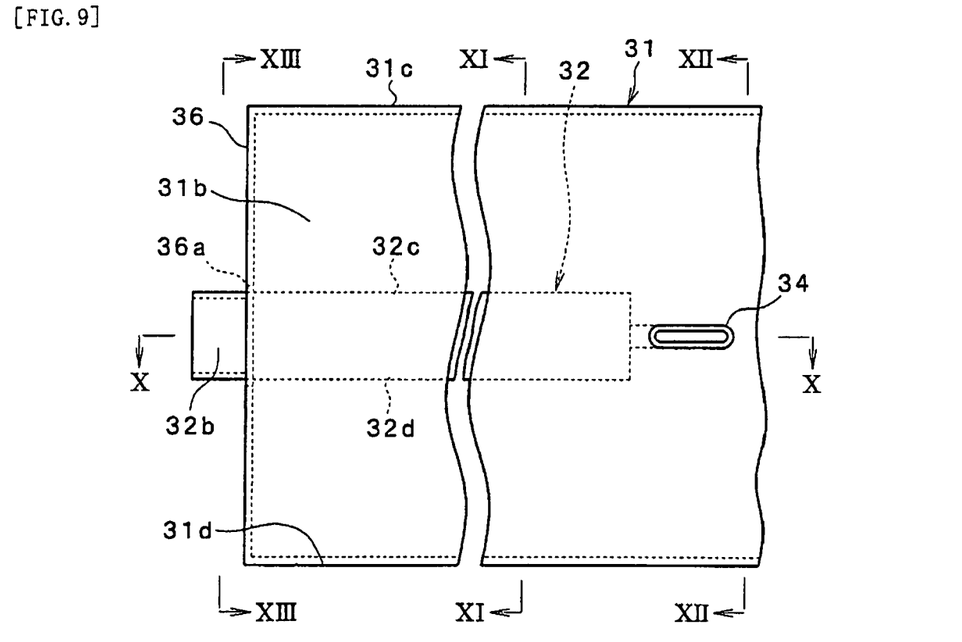
FIG. 9 is a side view of the basic construction of the other embodiment of the microwave chemical reaction device in accordance with the present invention.

The intensity of the microwave electric field within the reaction targets 5 is almost uniform in the direction at right angle to the plane of illustration in FIG. 9 and changes in a sine curve fashion in the vertical direction. Since the reaction targets 5 are positioned about the center of the waveguide 31 near the maximum level of the microwave electric field, the intensity is substantially uniform when the vertical thickness is sufficiently smaller than the vertical distance of the waveguide 31.

It is not necessarily required that the center of the flow path 32 should geometrically coincide the center of the square waveguide 31. They are only required to coincide to an extent such that sufficient intensity of the electric field is assured without serious loss of uniformity. Stated otherwise, it is required that the side walls 2c and 2d should be parallel to the electric field and the most axial region of the flow path 32 should be located near the center axis of the waveguide 31 whereat the electric field assumes the maximum level.

Figure 10:
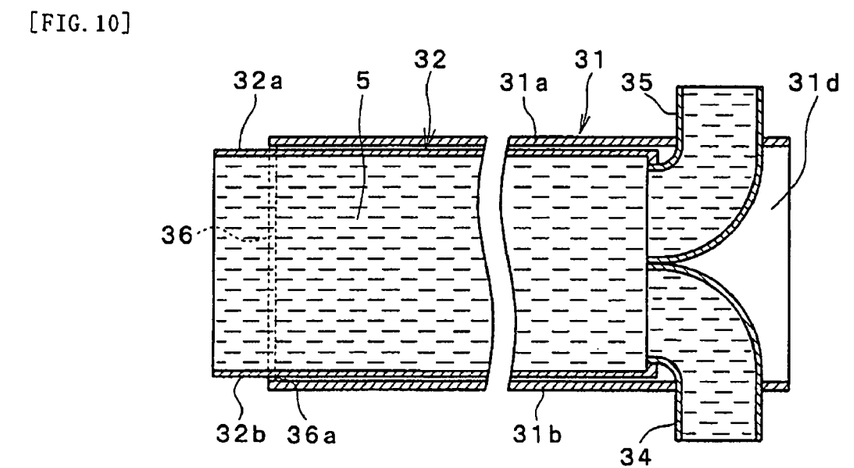
FIG. 10 is a section taken along the line MICROWAVE in FIG. 9.

The reaction targets 5 flow leftward in FIGS. 9 and 10. Since the microwave is also transmitted in this direction, the reaction targets 5 and the microwave both flow downstream in parallel fashion. Since the transmission speed of the microwave is extremely faster than the traveling speed of the reaction targets 5, the reaction targets 5 are acted by microwave irradiation of same intensity level in average in the flowing direction and the chemical reaction advances uniformly in the flow direction.

The energy carried by the microwave is consumed by the reaction targets 5 as the microwave is transmitted in the axial direction and, as a consequence, the arrangement of the reaction device is designed so that almost all of the energy should be consumed at arrival at the discharge end of the reaction targets 5. As an alternative, a short circuit board may be arranged new the discharge end for shielding and reflection of the microwave so that almost all of the energy carried by the microwave should be consumed at arrival at the upstream end of the flow path 32 after reflection.

Although the foregoing description is based on an assumption that the waveguide 31 and the flow path 32 both extend straightly, they may be somewhat curved as long as the waveguide 31 internally accommodates the flow path 32.

As shown in FIG. 10, flow-in tubes 34 and 35 are connected to the upstream end of the flow path 32 for introduction of the reaction targets 5. In the case of the illustrated embodiment, the flow-in tubes 34 and 35 take a form of a hollow cylinder whose transverse cross section is of an oval profile flat in the vertical direction. The flow-in tubes of this type well avoid stagnation of the reaction targets 5 at the upstream end of the flow path 32. The transverse cross sectional profile of the flow-in tubes is, however, not limited to this example. The section of the flow-in tubes 34 and 35 located within the waveguide 31 is usually made of a dielectric material of small microwave loss and the section located outside the waveguide 31 is made of metal or covered with a cylindrical metal fitting of a configuration suited for cut-off of microwave.

Figure 13:
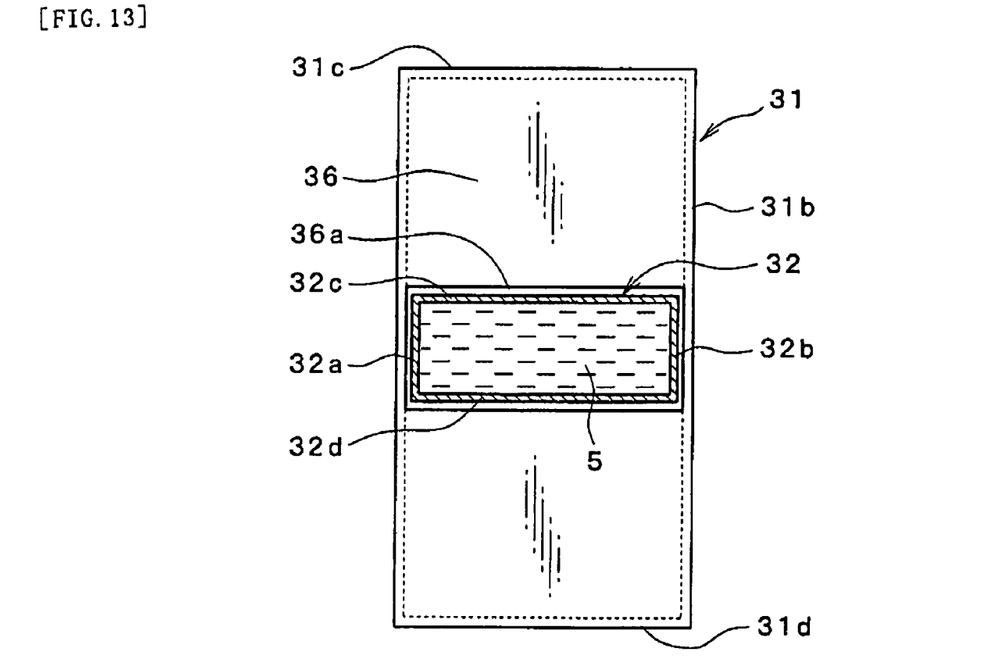
FIG. 13 is a section taken along the line XIII-XIII in FIG. 9.

One example of the discharge end for the reaction targets 5 is shown in FIG. 13. Most of the microwave is consumed during parallel transmission with the reaction targets and the microwave assumes considerably low level at the discharge end. The waveguide 31 is shorted out by a short-circuit board 36. The short-circuit board 36 is provided with a central square opening 36a through which the flow path 32 extends.

Since the microwave is cut off, leakage of the microwave can be suppressed to a low level causing substantially no safety problems as long as the thickness of the short-circuit board 36 is properly designed. The microwave reflected by the short-circuit board 36 is transmitted upwards and energy carried by the microwave is absorbed by the reaction targets 5 during this transmission so that the intensity of the microwave is at a low level causing no safety problems. This indicates the fact that a chemical reaction device of an extremely high efficiency can be provided. The flow path 32 extends through the short-circuit board 36 in order to conduct the reaction targets 5 after the reaction to a predetermined section.

In the case of the embodiments shown in FIGS. 9 to 13, the microwave and the reaction targets advance in a same direction. Since the transmission speed of the microwave is extremely faster than the traveling speed of the reaction targets 5, it is not necessarily required to advance the microwave and the reaction targets in a same direction, The may be advanced in opposite directions too.

The combination of such advancement may be selected properly in accordance with in which direction the reaction of the reaction targets is required to advance. In the case of the embodiments shown in FIGS. 9 and 10, the reaction targets are introduced laterally into the microwave advancing straight for parallel leftward advancement in the illustration. They may be advanced rightward too. It is also employable that microwave is introduced laterally into reaction targets advancing straight for same or opposite advancement with the reaction targets.

Figure 14:
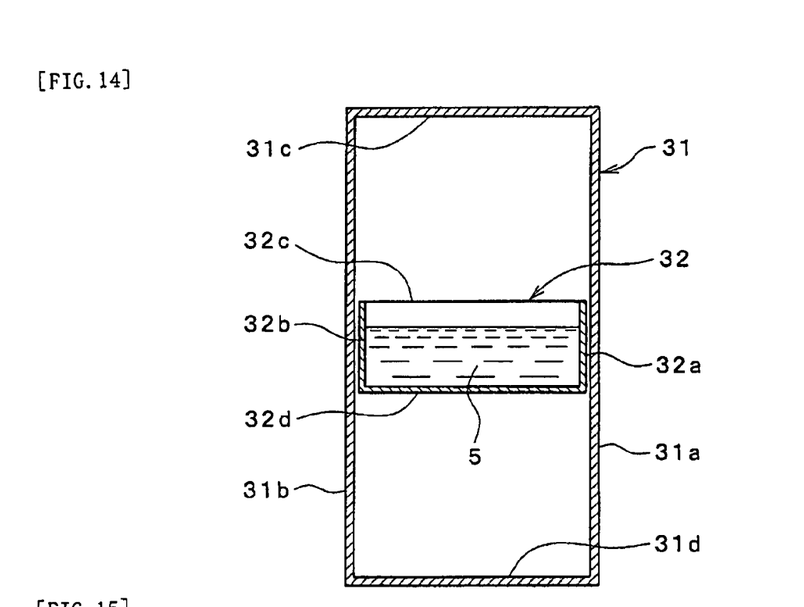
FIG. 14 is a sectional side view of the basic construction of the other embodiment of the microwave chemical reaction device in accordance with the present invention.

A further embodiment of the reaction device in accordance with the present invention is shown in FIG. 14 in which a variant of the flow path 32 is shown. In the case of this embodiment, the flow path 32 is provided with a thin transverse cross sectional profile which has a depth larger than the width and open in the top side. The flow path 32 is arranged so that its bottom surface is parallel to the electric field in order to suffice the interface conditions.

During chemical reactions unnecessary products such as reaction water are often generated. The reaction water generated is discharged into the waveguide 31 past the upper opening of the flow path 32. For discharge of steam gas within the waveguide 31, the short-circuit board 36 or a ventilation tube (not shown) is arranged extending through the upper wall 31c of the waveguide in connection to a exhaust pump for absorption of the steam gas.

As chemical reaction advances viscosity in the system tends to increase. In such a case, there is a possibility that stagnation occurs in the flow of the reaction targets 5 and it is necessary to promote the flow compulsorily. To this end, it is one of the solutions to provide the waveguide 31 and the flow path 32 with inclined constructions but this solution is not sufficient for avoiding the stagnation.

Figure 15:
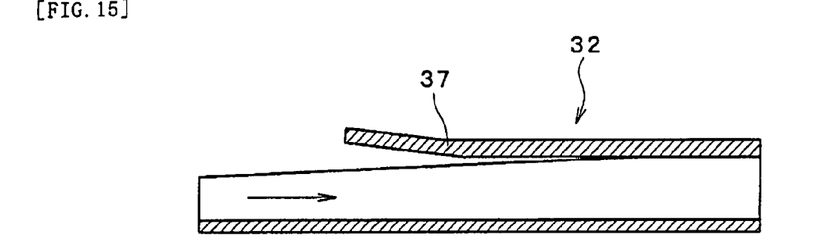
FIG. 15 is a sectional side view of the other embodiment of the flow path for reaction target in accordance with the present invention.

Stagnation causes rise in level. So, as shown in FIG. 15, the upper side of the flow path 32 is covered with a lid 37. Due to presence of such a lid 37, the downstream end of the flow path 32 assumes a hollow cylindrical configuration closed up and down and left and right. For block discharge of the reaction targets at the downstream end, suction by a pump is employed. Through establishment of balance in this solution, the reaction targets with increased viscosity can be discharged without stagnation.

Figure 16:
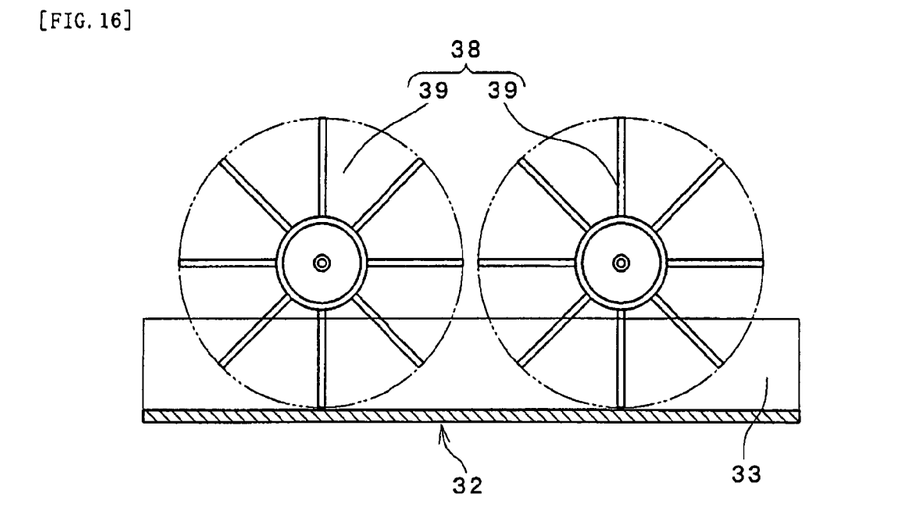
FIG. 16 is a partly sectional side view of the discharge unit of reaction target used for the reaction device in accordance with the present invention and FIG. 17 is a sectional side view of the discharge unit of reaction target used for the reaction device in accordance with the present invention.
Figure 17:
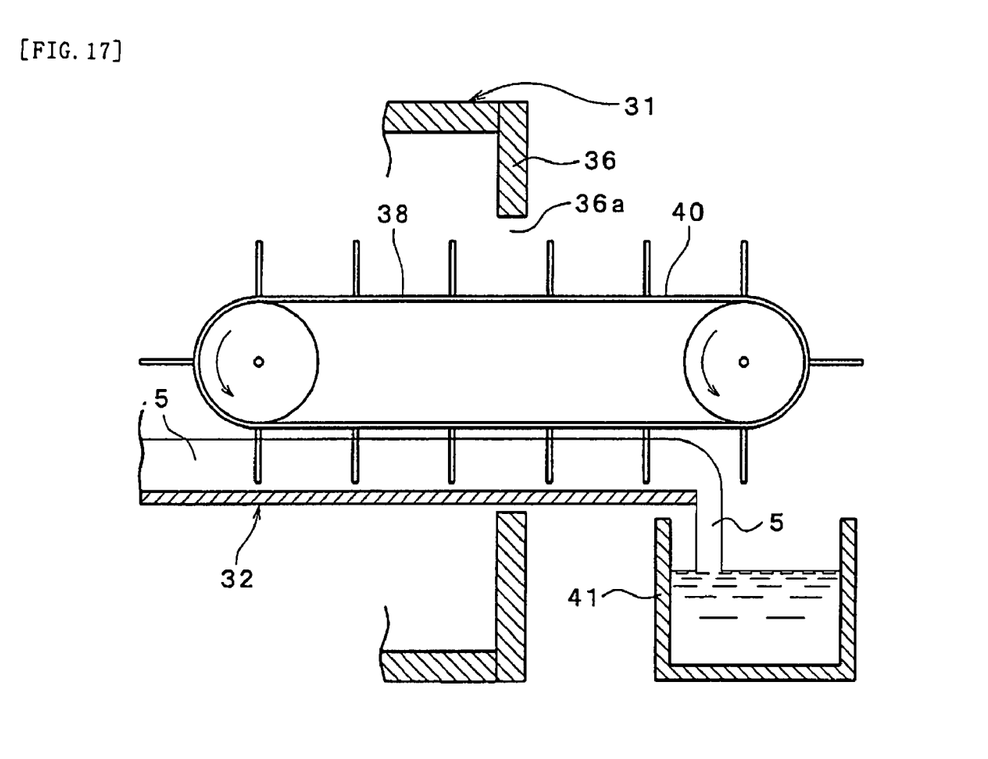

A further embodiment of the reaction device in accordance with the present invention is shown in FIGS. 16 and 17 in which the reaction targets 5 with increased viscosity can be mechanically pushed out of the system by a compulsory delivery unit 38 provided with peddle type vanes. In the case of the embodiment shown in FIG. 16, the delivery unit 38 is comprised of a plurality of mill wheels 39. Whereas, in the case of the embodiment shown in FIG. 17, the delivery unit 38 is comprised of an endless belt 40 driven by pulleys. The reaction targets pushed out of the system flow into a tank 41.

Although the endless belt 40 extends through the short-circuit board 36 of the waveguide 31, problems of microwave leakage can be avoided by substantially increasing the thickness of the short-circuit board 36 because the opening 36a is set to a dimension able to cut off the microwave.

At least the most section of the delivery unit 38 located within the waveguide 31 is made of a dielectric material of low microwave loss and small permittivity. Since the level of the microwave is considerably lowered near the downstream end of the waveguide 31 for attachment of the delivery unit 38, the vanes and their supporting mechanism may be made of, for example, quartz and bearings may be partly made of metals.

The reaction device in accordance with the present invention is advantageously used for a system for efficient practice of chemical reactions of relatively large amount of fluids.

The invention claimed is:

1. A microwave chemical reaction device comprising a first square waveguide for transmission of micro waves of TE10 mode,
  a first short circuit piece for short-circuit of a downstream end of said first square waveguide,
  a circular waveguide substantially at right angle connected at one end to said first square waveguide on an upstream side said first short-circuit piece,
  a second square waveguide substantially at right angle connected to the other end of said circular waveguide,
  a second short circuit piece connected at one end to said second waveguide near a junction of said circular waveguide,
  a non-reflective end piece for closing an end of said second waveguide opposite to said second short circuit piece and
  a micro-wave low-loss circular tube extending coaxially within said circular waveguide and accommodating reaction targets
  characterized in that TM01 mode microwave transduced from said TE10 mode microwave in said first square waveguide is transmitted into said circular waveguide and
  TE mode microwave re-transduced from said TM01 mode microwave within said circular waveguide is transmitted into said second square waveguide for consumption at said non-reflective end piece.

2. The reaction device as claimed in claim 1 characterized in
that said circular tube has a double cylindrical construction defining a double flow path for circulation of said reaction targets.

3. The reaction device as claimed in claim 1 characterized in that a reflector is arranged within said second square waveguide instead of said non-reflective end piece for reflection of said TE10 mode microwave,
that said TE10 mode microwave is re-transduced by said reflector and
that re-transduced microwave is transmitted into said circular waveguide for action on said reaction target.

* * * * *